United States Patent
Freitag et al.

(10) Patent No.: US 6,312,065 B1
(45) Date of Patent: Nov. 6, 2001

(54) CONTROL SYSTEM FOR BRAKE POWER PROPORTIONING ON A ROAD VEHICLE

(76) Inventors: Rainer Freitag, Rooschutzweg 10/1, Owen, D-73277; Mathias Hartl, Friedhofstrasse 16, Rommelshausen, D-71394; Wilfried Huber, Bahnhofstrasse 5, Ostelsheim, D-75395; Andreas Platte, Klestermuhle 10, Denkendorf, D-73770; Harry Troester, Calwerstrasse 8, Tamm, D-71732, all of (DE)

(*) Notice: Subject to any disclaimer, the term of this patent is extended or adjusted under 35 U.S.C. 154(b) by 0 days.

(21) Appl. No.: 09/269,563

(22) PCT Filed: Sep. 30, 1997

(86) PCT No.: PCT/EP97/05364

§ 371 Date: Oct. 4, 1999

§ 102(e) Date: Oct. 4, 1999

(87) PCT Pub. No.: WO98/14356

PCT Pub. Date: Apr. 9, 1998

(30) Foreign Application Priority Data

Sep. 30, 1996 (DE) .............................................. 196 40 467

(51) Int. Cl.$^7$ .............................. B60T 8/24; B60T 8/34; B60G 17/015
(52) U.S. Cl. ........................................... 303/187; 303/186
(58) Field of Search .................................. 303/3, 15, 20, 303/115.2, 186, 187, 188, 189; 364/426.025

(56) References Cited

U.S. PATENT DOCUMENTS

| | | | |
|---|---|---|---|
| 5,251,136 | * 10/1993 | Fukuyama et al. | 364/424.05 |
| 5,482,361 | 1/1996 | Burckhardt et al. | |
| 5,501,514 | * 3/1996 | Resch et al. | 303/115.4 |
| 5,696,681 | * 12/1997 | Hrovat et al. | 364/426.01 |
| 5,722,743 | * 3/1998 | Sano | 303/146 |
| 5,722,744 | * 3/1998 | Kupfer et al. | 303/189 |

FOREIGN PATENT DOCUMENTS

| | | |
|---|---|---|
| 39 23 599 A | 2/1990 | (DE) . |
| 39 41 702 A | 6/1991 | (DE) . |
| 40 14 561 A | 11/1991 | (DE) . |
| 44 22 518 A | 8/1995 | (DE) . |
| 0 201 843 A | 11/1986 | (EP) . |
| 0 368 359 A | 5/1990 | (EP) . |
| 0 378 202 A | 7/1990 | (EP) . |
| 0 672 565 A | 9/1995 | (EP) . |
| 61-050858 | 3/1986 | (JP) . |
| 6150858 | 3/1986 | (JP) . |
| 01301445 | 12/1989 | (JP) . |
| 2208107 | 8/1990 | (JP) . |
| 05050914 | 3/1993 | (JP) . |
| 06024304 | 2/1994 | (JP) . |
| 6211018 | 8/1994 | (JP) . |
| 07081534 | 3/1995 | (JP) . |
| 08099624 | 4/1996 | (JP) . |
| 8163707 | 6/1996 | (JP) . |

* cited by examiner

Primary Examiner—Christopher P. Schwartz
(74) Attorney, Agent, or Firm—Crowell & Moring LLP

(57) ABSTRACT

A braking-force control system and method is provided for a road vehicle having an electrically controllable four-circuit brake system. The braking forces generated by the individual wheel brakes can be adjusted in a wheel-specific way. Adjustment devices on a chassis vary the normal forces acting on the vehicle wheels, with at least one normal-force adjustment device being provided per vehicle wheel.

The adjustment devices are configured so that, for the most part, the weight of the vehicle can be supported on one of the front wheels and on the rear wheel of the vehicle which is arranged diagonally opposite the latter.

The braking force generated by a front-wheel brake and the rear-wheel brake which lies opposite the latter viewed along the diagonal of the vehicle, corresponds overall to the vehicle weight multiplied by a maximum coefficient of friction which is effective between the carriageway and the braked wheels.

15 Claims, 2 Drawing Sheets

CONTROL SYSTEM FOR BRAKE POWER PROPORTIONING ON A ROAD VEHICLE

BACKGROUND OF THE INVENTION

The present invention relates to a braking-force control system for a road vehicle having an electrically controllable four-circuit brake system, in which the braking forces which can be generated by the individual wheel brakes can be adjusted in a wheel-specific way. A chassis is equipped with adjustment devices for varying the normal forces acting on the vehicle wheels, at least one normal-force adjustment device being provided per vehicle wheel. The brake system is configured so that the braking force, which can be generated by a front-wheel brake and the rear-wheel brake which lies opposite the latter viewed along the diagonal of the vehicle, corresponds overall to the vehicle weight multiplied by a maximum coefficient of friction which is effective between the carriageway and the braked wheels. The adjustment devices for the distribution of normal force are configured so that, for the most part, i.e. with the exception of small fractions, in the range of a few per cent (for example 5%) of the wheel loads which are symmetrically and approximately uniformly distributed in a static case, the weight of the vehicle can be supported on one of the front wheels and on the rear wheel of the vehicle which is arranged diagonally opposite the latter.

The braking-force control system according to the invention provides at least the following advantages:

By means of the normal-force adjustment devices alone, effective vehicle-movement regulation in order to compensate oversteering or understeering behavior of the vehicle is already possible without a vehicle-movement regulation system which operates with the build-up of brake slip being necessary from the outset. The regulation system instead only needs to be activated if the control of the distribution of the normal force is no longer sufficient to achieve a desired cornering behavior. As a result, brake wear is reduced. The two wheel brakes of one vehicle diagonal achieve virtually the same vehicle deceleration which it would otherwise only be possible to achieve by activating all the wheel brakes. Accordingly, when one wheel brake fails or when both wheel brakes which lie opposite one another along a diagonal of the vehicle fail, virtually the maximum deceleration of the vehicle can still be achieved, which can be considered a considerable safety benefit.

DE 42 01 496 A1 shows that the changes in wheel load which result from the rolling moments occurring during cornering by actuating hydraulic chassis adjustment devices can be distributed in such a way that a virtually neutral steering behavior which is aimed at is obtained. DE 40 14 561 also teaches that pitching moments, which occur as a result of controlled changing of the resilience of suspension or shock-absorber elements, can be absorbed which also corresponds to a change in the distribution of the wheel load.

In contrast to the known control devices in which the distribution of the wheel load can only be changed within relatively narrow limits, i.e. in relation to the absolute value of the rolling and pitching moments which occur, in the braking-force control system according to the invention a maximum possible variation of the distribution of the wheel load is provided in order to achieve a correspondingly effective expansion of the vehicle-movement regulating range which is necessary to enable a vehicle-movement brake intervention to be utilized to the greatest possible degree.

In an advantageous embodiment of the braking-force control system, the increase in the braking force which is necessary for a "two-wheel braking operation" by just one front-wheel brake and the rear-wheel brake which is diagonally opposite is achieved by pressure-increasing actuation of the brake-pressure adjustment devices which, because this method of braking is intended as it were only for an emergency, is readily possible and does not lead to appreciable additional wear.

At the same time, it may be expedient if the brakes have, for example, four-piston brake callipers, just one pair of pistons being utilized in normal braking mode, and the further pairs of pistons being utilized for generating braking force in diagonal braking mode.

It is particularly advantageous if the braking-force control system is configured to the effect that, for reverse travel, it is possible to use a braking-force distribution with a greater proportion of braking force at the rear axle than the proportion of braking force at the front axle so that even when reversing under poor road conditions the best possible decelerations of the vehicle can still be achieved.

If only one of the wheel brakes is used for generating braking force at the start of a braking operation, conclusions regarding the condition of the brake linings can be drawn from a comparison of a measured value of the vehicle deceleration with a value of the setpoint deceleration which has been calculated on the basis of the geometric brake data and the measured brake pressure, and a diagnosis of this can easily be carried out.

In an analogous way, it is possible to determine the current value of the coefficient of friction ($\mu$) of the carriageway by activating only one of the wheel brakes at certain times. Such activation operations of just one wheel brake are expediently carried out at regular time intervals and in driving situations in which the driver does not activate the brake system and the vehicle rolls with an essentially constant speed. In such braking cycles which are carried out in order to detect the coefficient of friction, the braked wheel is releived of loading by activating its normal-force adjustment device to such an extent that the wheel load of the braked wheel is reduced to a small fraction of, for exampl, just 10% to 30% of its wheel load which is effective during unbraked travelling so that the braking of this wheel results only in a decleration of the vehicle which cannot be sensed by the driver. Such decleration can also be compensated by virtue of the fact that a compensatory increase in the propulsion moment generated by the vehicle engine is automatically applied during the measurement cycle of the coefficient of friction, so that the reaction on the vehicle which is produced as a result of the individual-wheel braking operation is virtually compensated. During such a braking operation, the wheel-braking force which is applied is increased unitl the brake slip occuring at this wheel reaches a value of, for example, 30% to 405 which is characteristic of a maximum possible utilization of adhesion.

In a preferred embodiment of the braking-force control system, even in the case of partial or full braking which is initiated by the driver and is intended to bring about significant deceleration of the vehicle (and, if appropriate, also a braking operation which is directed, at least in its initial phase, as an automatically controlled full braking (brake assistant function)), the coefficient of friction $\mu$ of the carriageway which can be utilized is determined. For this purpose, the braking-force and the normal-force control systems are actuated so that, at the start of the braking operation, an overwhelming proportion of the vehicle weight is supported by just two vehicle wheels which lie diagonally opposite one another and which are then appropriately braked to a greater extent, and the wheels of the other diagonal of the vehicle are correspondingly relieved of loading. At the vehicle wheels which have been relieved of loading, the wheel brakes are actuated with an incremental or monotonously continuous increase in the brake pressure, and the rate of change $d\omega/dt$ of the wheel speed is continuously determined. For the brake pressure $p_B$ at which the maximum rate of change of the wheel speed occurs, the maximum coefficient of friction $\mu$ of the carriageway which can be utilized is determined according to the relation $$\mu = \frac{\Theta \cdot \left(\frac{d\omega}{dt}\right)_{max} - M_B}{F_N \cdot r_{dyn}}$$

in which the moment of inertia of the braked wheel which has been relieved of loading is designated by $\Theta$, the wheel load which is acting on this wheel is designated by $F_N$, its dynamic rolling radius is designated by $r_{dyn}$, the braking torque which is given by the setting of the brake pressure at the maximum change of rate of the wheel speed is designated by $M_B$, and the braking torque $M_B$ itself is given by the relation $$M_B = p_B \cdot C_B$$

in which the applied brake pressure is designated by $p_B$, and a proportionality factor which takes into account the configuration of the brakes is designated by $C_B$.

This determination of the coefficient of friction of the carriageway which can be utilized, both for the left-hand and for the right-hand side of the vehicle, also makes it possible to detect, as it were, in one measurement cycle, whether these coefficients of friction are different from one another, i.e. "$\mu$-split conditions" apply which are particularly critical, for example when regulating brake slip, so that awareness of them is particularly important, as it were, for preselecting regulating parameters.

A variant of a braking-force control system according to the invention has the advantage that, independently of the load state of the vehicle and of the topography of the carriageway, the same, defined value of the deceleration of the vehicle is always associated with a defined pedal position of a braking-force setpoint value signal transmitter, as a result of which the braking comfort is considerably improved.

In the case of a vehicle which has at least one electric drive or an electric auxiliary drive which, in order to generate braking force, can be switched over into a recuperation mode which is suitable for charging the vehicle battery, one configuration of the braking-force control system is particularly advantageous to the effect that although the recuperation capability is used to the greatest possible extent to generate braking force, accompanied by permanent monitoring of the operating and functional status of the vehicle battery, the hydraulic wheel brakes are also activated at the correct time before rapid charging of the vehicle battery is no longer possible and there could be a drop in the deceleration of the vehicle due to the reduction of the recuperation braking torque, so that a setpoint value-controlled vehicle deceleration can reliably be maintained. This demand-adjusted utilization of the power which can be recuperated electrically in order to generate braking force makes it possible both to operate the hydraulic brakes in a wear-minimizing way and also permits optimum use of the capacity of a battery without overloading the battery.

With a brake-force control system according to the present invention, it is also possible to implement an effective regulating operation which is aimed at stable vehicle-movement behavior of a road vehicle and in whose initial phase a vehicle-movement regulating operation is carried out by tensioning the chassis by way of the normal-force adjustment devices to bring about the respectively most favorable distribution of the wheel load in terms of vehicle movement, and if it is still not possible to achieve vehicle-movement stability to a sufficient degree using this approach alone, the distribution of cornering force between the front wheels and the rear wheels of the vehicle in a way which is most favorable in terms of vehicle movement is achieved by additional braking intervention and resulting build-up of brake slip.

BRIEF DESCRIPTION OF THE DRAWINGS

Further details of the braking-force control system according to the invention and the vehicle-movement regulating system will be better understood from the following description of a specific embodiment and of variants of the same with reference to the drawings, in which.

DETAILED DESCRIPTION OF THE DRAWINGS

Figure 1:
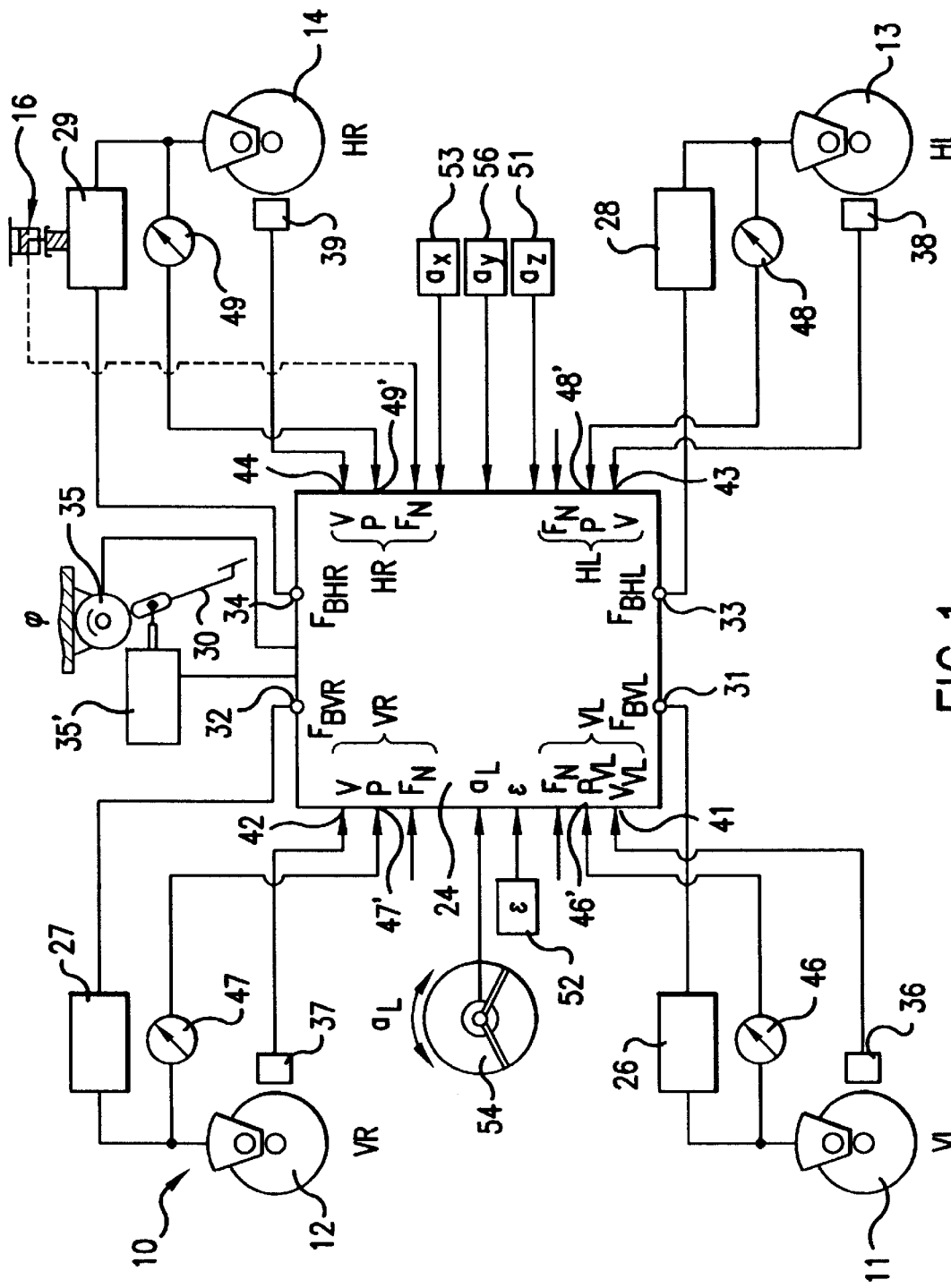
FIG. 1 is a schematically simplified block circuit diagram of a braking-force control system according to the invention.
Figure 2:
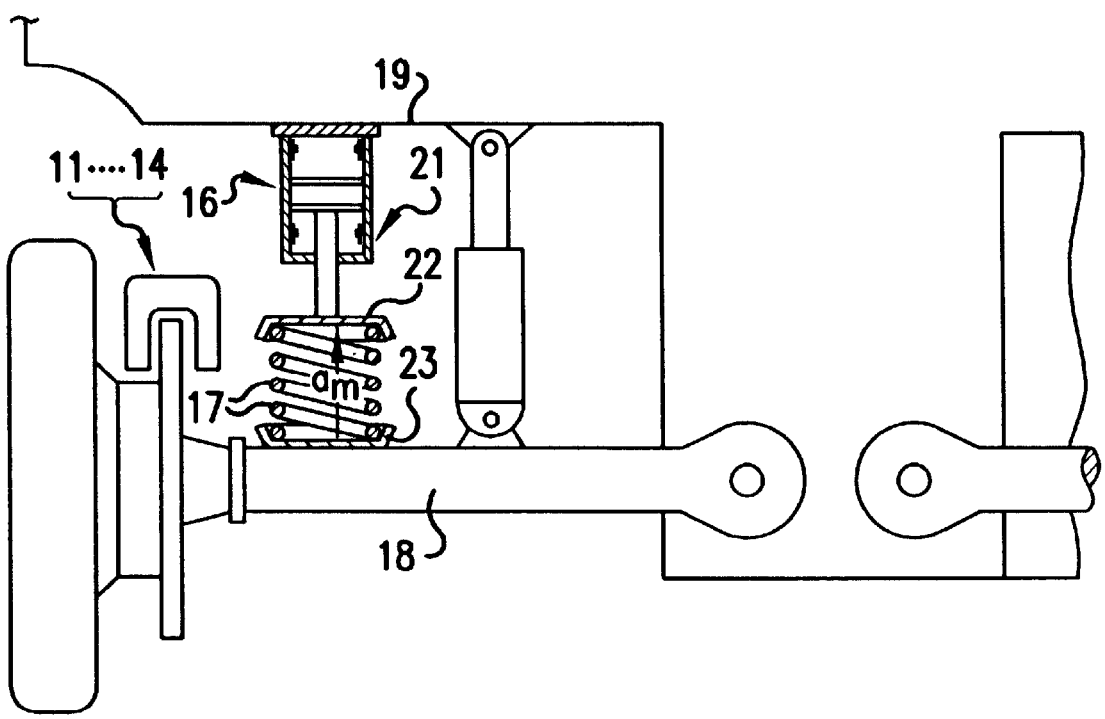
FIG. 2 is a partial schematic diagram showing details of a normal-force adjustment device of the braking-force control system according to FIG. 1.

The braking-force control system which is designated in its entirety by numeral 10 in FIG. 1 is intended for a road vehicle which has four vehicle wheels and is equipped both with an electrohydraulic brake system allows different brake pressures to be applied to the wheel brakes 11 to 14 of its brake system on a wheel-specific basis, and is equipped with a so-called active chassis which provides the capability of changing the wheel loads which can be supported on the carriageway by the vehicle wheels, with the sum of the wheel loads remaining constant of course, in a way which is appropriate for the situation so that maximum dynamic stability of the vehicle is maintained.

For this purpose, tensioning devices 16 which are individually assigned to the vehicle wheels, can be actuated electrically for adjusting the prestressing of "passively" elastic spring elements, for example of helical springs, which elements resiliently support an axle tie rod 18, assigned to the respective vehicle wheel, of the front axle or rear axle of the vehicle on which the respective vehicle wheel is rotatably mounted so as to be capable of pivoting up and down. Only one of these tensioning devices being illustrated schematically in FIG. 1.

In the specific embodiment illustrated, the tensioning devices 16 have linear hydraulic cylinders 21 which are fixed to the vehicle body, are double acting, and can be actuated electrically by solenoid valves (not illustrated) such that the distance, in the vertical direction, between spring plates 22 arranged on the vehicle body and spring plates 23 arranged on the axle tie rod, the passive elastic spring elements 17 of the vehicle suspension being arranged in a clamped-in configuration, can be varied in a controlled fashion. As a result, the wheel-load adjustment which has been referred to can thus be achieved. The tensioning devices 16 are equipped with displacement sensors (not illustrated) for sensing the position of the pistons of the hydraulic cylinders within their housings. For example, these tensioning devices 16 can be adjusted in such a way that when the vehicle is stationary, the far greater part of the weight of the vehicle is supported on one of the front wheels and on the rear wheel which is diagonally opposite it. In this case, assuming that the front-axle and the rear-axle loads are equal, the loaded front wheel and the loaded rear wheel each support approximately half of the weight of the vehicle, while the two other wheels of the vehicle are virtually unloaded and, in this situation, the body of the vehicle would not inclined with respect to the carriageway.

This method of supporting the vehicle by two vehicle wheels which represent the diagonal of the vehicle is also significant for the dynamic mode of the vehicle, as will be explained further below.

The braking-force control system 10 according to FIG. 1 comprises braking-pressure adjustment devices 26, 27, 28 and 29 which are assigned individually to each of the wheel brakes 11 to 14 and which are assigned, in the sequence of their numbering, to the left-hand front-wheel brake 11, the right-hand front-wheel brake 12, the left-hand rear-wheel brake 13 and the right-hand rear-wheel brake 14.

These braking-pressure adjustment devices are configures in such a way that they increase, maintain or reduce the brake pressure in the respective wheel brake 11 to 14 when, and for as long as, the setpoint value output signals containing the relevant information are present at the relevant setpoint value outputs 31 to 34 of an electronic control unit 24 of the braking-force control system.

The electronic control unit 24 can itself be actuated by at least one electromechanical or electronic position encoder 35 or 35', which generates an electrical output signal which is a measure of the absolute value of the vehicle deceleration $(-a_x)$ which the driver would like to achieve by activating the brake system.

In order to be able to sense the dynamic behavior of the vehicle wheels, and thus also indirectly of the vehicle, wheel speed sensors 36 to 39 which are individually assigned to the vehicle wheels are provided. The sensors 36 to 39 generate electrical output signals which are characteristic of the circumferential speeds of the wheels and which are fed to the electronic control unit 24 at relevant information inputs 41 to 44.

Furthermore, electromechanical or electronic pressure sensors 46 to 49 are individually assigned to the wheel brakes 11 to 14. The pressure sensors 46 to 49 generate electrical output signals which are a measure of the brake pressure applied to the respective wheel brake 11 to 14 and are fed to the electronic control unit 24 at relevant brake-pressure information inputs 46' to 49'.

Furthermore, the vehicle is provided with a yaw speed sensor 51, which generates electrical output signals which are a measure of the yaw speed $\psi$ with which rotational movements of the vehicle about its vertical axis take place, whether as a result of the fact that the vehicle travels through a bend in a dynamically stable way, or as a result of the fact that the vehicle is dynamically unstable because, for example, the cornering force of the rear wheels is no longer sufficient to keep the vehicle on course.

At least the following functions can be implemented by an evaluation and processing of the output signals of the pedal position encoder 35 or 35' which are carried out by the electronic control unit 24 according to the usual criteria, the signals representing the driver's request for the vehicle to be decelerated, of the output signals of the wheel speed sensors 36 to 39 and of the brake-pressure sensors 46 to 49 as actual value sensors to form actuation signals for the brake-pressure adjustment devices 26 to 29, by way of the braking-force control system 10 which has been explained in this respect in terms of design and function:

a) the spot braking mode is controlled in accordance with setpoint value signals which are applied by the driver by activating the brake pedal;

b) the front axle/rear axle braking-force distribution is controlled, for example in order to maintain an ideal braking-force distribution taking into account vehicle deceleration values which have been determined by differentiating processing of the wheel-speed-sensor output signals;

c) if appropriate, automatic triggering of full braking if the activation behavior of the driver which can be detected from processing of the output signals of the pedal position encoder 35 by differentiating over time makes it possible to determine that the driver wishes the vehicle to be decelerated to a large degree;

d) anti-lock brake control by automatic modulation of the brake pressure by the brake-pressure adjustment devices 26 to 29 which can be actuated in a wheel-specific way;

e) traction control by automatic activation of those brake-pressure adjustment devices which are assigned to the driven vehicle wheels, for example the brake-pressure adjustment devices 28 and 29 of the rear wheels, and f) vehicle-movement control by automatically controlled build-up of brake slip at one or more of the vehicle wheels in order to reduce cornering force, for example at the front axle, and in this respect counteract an oversteering tendency of the vehicle.

Furthermore, with the braking-force control system 10, the function of controlling the distance between vehicles can be implemented when driving in backed-up traffic by automatically activating the brake system as a function of output signals of a sensor system which senses the distance from a vehicle travelling ahead, and the function of automatic parking brake mode on a carriageway with a positive or negative gradient, according to the usual plausibility criteria by automatically activating the brake-pressure adjustment devices 26 to 29.

In respect of the abovementioned "hillholder" function, it is advantageous if the vehicle is also equipped with an inclination sensor 52 which generates an electrical output signal which contains the information relating to the gradient of the carriageway $\epsilon$, and, in combination with the weight of the vehicle, can also be evaluated in units of a negative lift force which is acting on the vehicle and which has to be braked "away" when the vehicle is being braked when travelling downhill, and which contributes to the deceleration of the vehicle when it is being braked when travelling uphill.

In order to avoid being dependent on an evaluation of the output signals of the wheel speed sensors 36 to 39 when the longitudinal deceleration $(a_x)$ of the vehicle which occurs during braking is being determined, which evaluation would be subject to increasing inaccuracy as the wheelslip increases, the vehicle is also equipped with a longitudinal acceleration/deceleration sensor 53. The latter sensor generates output signals which are characteristic of the longitudinal acceleration or deceleration which is acting on the vehicle and which are also fed as information input signals to the electronic control unit 24, and can be processed by the control unit 24 as a setpoint/actual value comparison.

Furthermore, the electrical output signal of a steering angle $(\alpha)$ sensor is also fed to the electronic control unit 24 which detects, by reference to the output signal, what path radius the driver wishes to set when cornering. During the processing of the output signals of the wheel speed sensors 36–39, the electronic control unit 24 determines the expected lateral acceleration, an electronic or electromechanical lateral acceleration ($a_y$) sensor 56 has an electrical output signal which is a direct measure of the respective value of the lateral acceleration $a_y$ and is provided for "directly" sensing the lateral acceleration. From a comparison of the calculated lateral acceleration value with the measured one and/or by reference to the output signals of the yaw speed sensor 51, and also from the comparative processing of the output signals of the wheel speed sensors 36 to 39, the electronic control unit 24 detects whether or not the vehicle remains on the intended course and, if not, automatically decides to initiate vehicle-movement control measures which are suitable to counteract an oversteering or understeering tendency of the vehicle.

So that the tensioning devices 16 of the "active" chassis can also be effectively utilized here, i.e. for the purpose of a vehicle-movement control, these devices are configured to the effect that the passive, elastic spring elements 17, whose prestress in the spring-compression state when the vehicle is stationary assuming symmetrical load distribution with respect to the vertical longitudinal center plane of the vehicle, corresponds in each case to half the axle load, can be compressed by the hydraulic cylinders 21 of the tensioning devices 16 to such an extent that their spring prestress is substantially higher than half the value of the axle load including a dynamic increase in the axle load, occurring for example when the vehicle is braked in the longitudinal direction, and preferably corresponds to the maximum value of the axle load which can be respectively reached. Furthermore the tensioning devices 16 are configured so that the spring elements 17 can be relieved of tension by "retracting" the hydraulic cylinders in order to increase the spring length. This occurs to such an extent that their residual prestress then corresponds to just a small fraction of, for example, several per cent of the specified wheel load in a steady operating state of the vehicle in which neither longitudinal nor lateral accelerations are acting on the vehicle. By virtue of this adjustability of the spring prestress which can be controlled by the electronic control unit 24, the greater part of the overall weight of the vehicle can be distributed between two vehicle wheels, namely in each case between one front wheel and the rear wheel which is arranged diagonally opposite it, and to relieve of loading virtually completely the other front wheel and the rear wheel which lies diagonally opposite it.

By adapting them to this configuration of the tensioning devices 16, the brake-pressure adjustment devices 26 to 29 are configured in such a way that, it is possible with just one of the front-wheel brakes 11 and 12 in each case to build up one braking force which corresponds to the entire front-axle load component of the vehicle multiplied by a maximum value of the coefficient of friction $\mu$ ($\mu$=approximately 1). This value can be utilized between the carriageway and the vehicle wheels on a dry road with good grip. Similarly, the brake-pressure adjustment devices 28 and 29 of the rear-wheel brakes 13 and 14 are respectively configured in such a way that it is possible with one of the two wheel brakes, to generate a braking force which corresponds to the rear-axle load component multiplied by the maximum value of the coefficient of friction.

With this configuration of the brake-pressure adjustment devices 26 to 29 and, if necessary, also of the wheel brakes 11 to 14, a vehicle deceleration of the value $\mu \cdot G_g$ ($G_g$= overall weight of vehicle) can be generated just by activating, for example, the left-hand front-wheel brake 11 and the right-hand rear-wheel brake 14, i.e. to generate a vehicle deceleration which would otherwise only be achievable by utilizing all the wheel brakes 11 to 14 of the vehicle.

Therefore, when one of the front-wheel brakes 11 or 12 or a rear-wheel brake 13 or 14 fails, but also when a front-wheel brake fails and the rear-wheel brake arranged diagonally opposite it fails, the vehicle can still be braked with at least approximately the same maximum deceleration as when the brake system is completely intact.

The same applies analogously if a tire is damaged. Then the electronic control unit 44 can react in such a way that the damaged vehicle wheel is relieved of loading, in the same way the rear wheel which lies opposite this diagonally. The weight of the vehicle is, as it were, displaced to the wheels of the other diagonal of the vehicle.

Furthermore, the braking-force control system 10 is also configured for the implementation of the following functions:

Taking as a basis the situation in which the vehicle is exhibiting understeering behavior, during a cornering operation in which the front wheel on the inside of the bend is normally relieved of loading, for example in a right-hand bend the right-hand wheel, the wheel can be pressed, by activating its tensioning device 16 with the effect of compressing its wheel spring, onto the carriageway so strongly that virtually identical wheel loads are acting on the front wheels. Expediently, when there is such an adjustment of the wheel load, the tensioning device 16 of the front wheel which is on the outside of the bend is also simultaneously actuated in order to lengthen, relieve of loading, its wheel spring. The tensioning device 16 is also utilized to equalize the wheel load at the two front wheels. Assuming that there is an identical coefficient of friction at the front wheels, this also results in identical utilization of the adhesion at said wheels. Of course, other wheel-load distributions can also be selected by the tensioning devices 16.

By tensioning the vehicle, which is done by pressing down the right-hand front wheel and retracting the piston of the tensioning device 16 of the left-hand front wheel, the vehicle rear wheel which is on the inside of the bend is simultaneously relieved of loading further. The rear wheel which is on the outside of the bend is additionally loaded, with the result that unequal utilization of the adhesion occurs at the rear wheels. A further result is that the sum of the cornering forces of the rear wheels decreases overall and the vehicle turns into the bend, the previously existing understeering tendency being, as it were, counteracted by an oversteering tendency which is achieved by the adjustment of the wheel load.

If, however, the vehicle has an oversteering behavior, the oversteering tendency can be reduced or compensated because the tensioning device of the front wheel which is on the outside of the bend and has already been subjected to greater loading during the corner, is additionally actuated in order to increase the spring prestress of this front wheel. This also entails an increase in the normal force at the rear wheel on the inside of the bend, with the result that the vehicle is stabilized at the rear axle, and the cornering force at the front axle decreases because the wheel-load difference at the front axle increases. Expediently, in this case, the tensioning device of the front wheel which is on the inside of the bend is also activated in the opposite direction, i.e. with the effect of reducing the stress of its wheel spring.

In the event that this "vehicle-movement control" which is achieved using only the tensioning devices 16 is not sufficient for the dynamic stabilization of the vehicle, and that in addition the vehicle-movement control has to be effected by a braking intervention on the front wheel which is on the outside of the bend, and is subjected to greater loading, a stabilizing moment, rotating in the reverse direction, which is applied to said front wheel can thus be all the greater. As a result, the range accessible to a vehicle-movement control operation is expanded, since the adjustment of the wheel load has the effect of increasing the coefficient of friction of the carriageway.

It is assumed that it is not necessary to explain the electronic circuitry details of the electronic control unit 24, since, given knowledge of its purpose, a person skilled in the art can implement such a unit with known electronic open-loop and closed-loop control technology. This also applies with reference to the further functions which will be explained below and which are possible thanks to the "powerful" configuration of the adjustment devices 26 to 29 for the brake pressure and/or braking force, in particular the braking-force adjustment devices 28 and 29 of the rear-wheel brakes 13 and 14 of the braking-force control system. Accordingly, for reverse travel, the control system is switched over to a distribution of the braking force with a relatively high braking-force component at the rear axle in comparison with that at the front axle. Thereby, particularly in winter, considerably better deceleration behavior can be achieved on roads with negative gradients covered in hard-packed snow.

Furthermore, a braking-force control is implemented which makes it possible to detect the state of the brake linings. To achieve this, braking is carried out with just one wheel at certain times, for example at the start of a braking operation, and the theoretical vehicle deceleration which is calculated form the measured wheel brake pressure and the geometric data of the brake is compared with the deceleration which has been measured by means of the deceleration sensor 53 or determined by reference to the output signals of the wheel speed sensors 36 to 39. If this reveals a difference in deceleration lying outside an acceptable tolerance range, a status display, which signals to the driver which brake lining still only has an inadequate coefficient of friction, is actuated.

Individual-wheel braking operations in the case of a low wheel load, which operations are repeated for example at regular, short time intervals, can also be used to determine the coefficient of friction ($\mu$) of the carriageway. Such braking operations can be readily controlled in such a way that they do not lead to an appreciable deceleration of the vehicle which could disturb the driver, since the coefficient of friction $\mu$ which is given in accordance with the relation $\mu=F_B/F_N$ as the ratio between the braking force $F_B$ and the normal force $F_N$ (wheel load) can be determined at low values of the wheel load which can be set.

The braking force $F_B$ which acts in such a case can be determined with a known configuration of the brakes by, for example, measuring the brake pressure which is increased in the case of such a braking operation until the braked vehicle wheel experiences a defined high level of slip, which can be determined by evaluating the output signals of the wheel speed sensors. The knowledge of the coefficient of friction of the carriageway makes it possible to adjust the electronic control unit 24 to the control algorithm which is most favorable for a predefined coefficient of friction.

Even in the case of partial or full braking which is initiated by the driver and is intended to bring about significant deceleration of the vehicle, if appropriate even in the case of a braking operation which is carried out, at least in its initial phase, as automatically controlled full braking (brake assistant function), the coefficient of friction $\mu$ of the carriageway which can be utilized is determined. For this purpose, the braking-force and the normal-force control systems can be actuated so that, at the start of the braking operation, an overwhelming proportion of the vehicle weight is supported by just two vehicle wheels which lie diagonally opposite one another and which are then appropriately braked to a greater extent, and the wheels of the other diagonal of the vehicle are correspondingly relieved of loading. At the vehicle wheels which have been relieved of loading, the wheel brakes are actuated with an incremental or monotonously continuous increase in the brake pressure, and the rate of change $d\omega/dt$ of the wheel speed is continuously determined. For the brake pressure $p_B$ at which the maximum rate of change of the wheel speed occurs, the maximum coefficient of friction $\mu$ of the carriageway which can be utilized is determined according to the relation $$\mu = \frac{\Theta \cdot \left(\frac{d\omega}{dt}\right)_{max} - M_B}{F_N \cdot r_{dyn}}$$

in which the moment of inertia of the braked wheel which has been relieved of loading is designated by $\Theta$, the wheel load which is acting on this wheel is designated by $F_N$, its dynamic rolling radius is designated by $r_{dyn}$, the braking torque which is produced by the setting of the brake pressure at the maximum change of rate of the wheel speed is designated by $M_B$, and the braking torque $M_B$ itself is given by the relation $$M_B = p_B \cdot C_B$$

in which the applied brake pressure is designated by $p_B$, and a proportionality factor which takes into account the configuration of the brakes is designated by $C_B$.

This determination coefficient of friction of the carriageway which can be utilized, both for the left-hand and for the right-hand side of the vehicle, also makes it possible to detect in one measurement cycle, whether these coefficients of friction are different from one another, i.e. "$\mu$-split conditions" apply which are particularly critical, for example when regulating brake slip, so that awareness of them is particularly important for preselecting regulating parameters.

Furthermore, it is possible to provide one method of braking-force control which, given a predefined position of the brake pedal 30, always brings about the same vehicle deceleration, irrespective of whether the vehicle is braked when travelling uphill or downhill and also irrespective of how the vehicle is loaded and/or whether it is travelling hitched up to a trailer. In the case of downhill travel, which can be detected by reference to the output signals of the inclination sensor 52, a higher braking force is applied compared with the case in which the vehicle is being braked on a horizontal carriageway. In the case of braking when travelling uphill, a lower braking force is applied so that the driver can always set a defined absolute value of the vehicle deceleration with the same pedal force which he has to apply counter to the restoring force of a travel simulation spring (not illustrated).

In the event that the vehicle has an electromotive drive or auxiliary drive, which also makes it possible to brake by recuperating kinetic energy by switching over the electromotive drive into the generator mode, the absolute value of the wheel brakes 11 to 14 is controlled. Thereby the vehicle is decelerated in such a way that although the braking torque which can be acquired through recuperation is utilized to the greatest possible extent, if the braking effect is not sufficient, the vehicle is switched over early enough to braking mode by the wheel brakes 11 to 14. As a result a continuous, "gentle" transition from recuperation braking to hydraulically supported braking is achieved and is not sensed by the driver.

On the basis of the fact that vehicle decelerations of up to 0.3 g (g=9.81 ms$^{-2}$) can be achieved by recuperation braking, for example, of a front-wheel-drive vehicle, the mechanical or hydromechanical brakes can be operated in a less wearing fashion in the partial braking region, which is statistically by far the most significant. That is, this method of braking in order to decelerate a vehicle is utilized to the greatest possible extent up to the aforesaid vehicle deceleration limit of approximately 0.3 g, i.e. as long as recuperation braking is possible at a given speed of the vehicle and with a given charge state of the battery.

In the event that the vehicle has electric drive motors which are individually assigned to the front wheels, or is configured as an all-wheel-drive vehicle with drive motors in which are individually assigned to the wheels, the motors can also be utilized as recuperation brakes in the vehicle-movement control mode so that the wheel brakes can, to this extent, and also in other respects, be effectively operated in a less wearing fashion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Braking-force control system in a road vehicle having a chassis, comprising an electrically controllable four-circuit brake system, in which braking forces are generatable by individual wheel brakes and are adjustable in a wheel-specific way, and adjustment devices operatively with the road vehicle chassis for varying the normal forces acting on the vehicle wheels, at least one normal-force adjustment device being provided per vehicle wheel, wherein the brake system is configured such that the braking force generatable by a front-wheel brake and a rear-wheel brake, which lies opposite the front-wheel brake viewed along a diagonal of the vehicle, corresponds in total to vehicle weight multiplied by a maximum absolute value of a coefficient of friction ($\mu$) utilizeable between a carriageway and the braked wheels, and the at least one normal-force adjustment device is arranged such that, except for a small fraction of wheel loads which are symmetrically and approximately uniformly distributed in a static case, the weight of the vehicle is supportable on one of the front wheels and on a diagonally arranged rear wheel of the vehicle.

2. The braking-force control system according to claim 1, wherein, with at least partial braking initiated by a driver to bring about significant deceleration of the vehicle, the braking-force and normal-force control system is configured to be actuated so that, at the start of the braking operation, a substantial proportion of the vehicle weight is supported by two diagonally opposite vehicle wheels, and the other wheels of the vehicle are correspondingly relieved of loading, and at at least one of the vehicle wheels which has been relieved of loading, the wheel brake or brakes are arranged to be actuated with an increased brake pressure, and means is provided for continuously determining rate of change (d$\omega$/dt) of the wheel speed, whereby a maximum value (d$\omega$/dt) max of the rate of change of the wheel speed permits the maximum coefficient of friction $\mu$ of the carriageway to be utilized to decelerate the vehicle determined according to the relationship $$\mu = \frac{\Theta \cdot \left(\frac{d\omega}{dt}\right)_{max} - M_B}{F_N \cdot r_{dyn}}$$

in which $\theta$ represents the moment of inertia of the braked wheel which has been relieved of loading, $F_n$ represents the wheel load which is acting on this braked wheel relieved of loading, $r_{dyn}$ represents its vehicle-movement rolling radius and $M_B$ represents the braking torque which is given by the generation of brake pressure at the maximum change of rate of the wheel speed, and $M_B$ is defined by the relationship $$M_B = p_B \cdot C_B$$

in which $p_B$ represents the applied brake pressure and $C_B$ is a proportionality factor which takes into account configuration of the brakes.

3. The braking-force control system according to claim 2, wherein means is provided for regulating the braking force as a function of deceleration such that the setpoint value-specifying signal, which the driver applies by activating a brake pedal, corresponds to a defined change in instantaneous vehicle deceleration.

4. The braking-force control system according to claim 3, wherein the vehicle is equipped with at least one battery-fed electric drive or auxiliary drive which, in order to generate braking force, is switchable over into a recuperation mode for charging the vehicle battery, the recuperation capability being accompanied by permanent monitoring of operating and functional status of the vehicle battery, and the hydraulic wheel brakes are activated at a time before rapid charging of the vehicle battery is no longer possible in order to maintain the setpoint value-controlled vehicle deceleration.

5. The braking-force control system according to claim 1, wherein means is provided for measuring the braking forces in a braking mode, in which just one front-wheel brake and the diagonally arranged rear-wheel brake are utilized for generating braking force, by increasing the brake pressure which is applied thereto.

6. The braking-force control system according to claim 1, wherein the wheel brakes comprises four-piston brake callipers which, in a normal braking mode, corresponds to utilizing all the wheel brakes, with pressure being applicable to just one pair of pistons, and in a diagonal braking mode in which brake pressure is appliable to just one front-wheel brake and one rear-wheel brake, pressure being appliable to both pairs of pistons of the wheel brakes.

7. The braking-force control system according to claim 1, wherein the rear-wheel brakes have the same configuration as the front-wheel brakes in terms of possible generation of braking force, and, for reverse travel, the brake system is switchable over to a braking-force distribution with a greater proportion of breaking force at the rear axle than the proportion of braking force at the front axle.

8. The braking-force control system according to claim 1, wherein, at certain times, including at a braking operation start, only one of the wheel brakes is configured to be utilized for generating braking force, and means is provided for acquiring a status signal for the coefficient of friction of the brake linings from a comparison of a measured value of the vehicle deceleration with a value of the setpoint deceleration which has been calculated on the basis of the geometric brake data and the measured brake pressure.

9. The braking-force control system according to one of claim 1, wherein, at certain times, including in a regular sequence, only one of the wheel brakes is configured to be utilized for generating braking force, during which the normal-force adjustment device of the braked wheel being actuated in order to reduce the wheel load of the braked wheel, such that the wheel load is reduced to a fraction of half the axle load and, when a slip value which is characteristic of maximum possible utilization of adhesion, the effective coefficient of friction of the carriageway is determined from the ratio of the braking force to the normal force.

10. A braking-force control method for a road vehicle having an electrically controllable four-circuit brake system, comprising the steps of generating braking forces via individual wheel brakes and wheel-specifically adjusting the braking forces; varying normal forces actuable on each vehicle wheel; and making a braking force generatable by a front-wheel brake and a rear-wheel brake which lies diagonally opposite the front-wheel brake viewed along a longitudinal direction of the vehicle, correspond in total to vehicle weight multiplied by a maximum absolute value of the coefficient of friction ($\mu$) utilizable between a carriageway and braked wheels, whereby the weight of the vehicle is supportable on one of the front wheels and on the rear wheel diagonally opposite thereto with the exception of a fraction of the wheel loads which are symmetrically and approximately uniformly distributed in a static case.

11. The braking-force control method according to claim 10, wherein the increase in the braking forces in braking mode, in which just one front-wheel brake and the rear-wheel brake arranged diagonally opposite thereto is utilized for generating braking force, is effected by increasing the applied brake pressure.

12. The braking-force control method according to claim 10, wherein in the event of at least partial braking initiated by a driver to bring about substantial deceleration of the vehicle, the method further comprises supporting at a start of braking operation, an overwhelming proportion, of the vehicle weight by two vehicle wheels which lie diagonally opposite one other, and the wheels of the other diagonal of the vehicle are correspondingly relieved of loading, and at least one of the vehicle wheels which have been relieved of loading, the wheel brake or brakes are actuated with an increase in the brake pressure, continuously determining the rate of change (d$\omega$/dt) of the wheel speed, and, based on a maximum value (d$\omega$/dt)$_{max}$ of the rate of change of the wheel speed, determining a maximum coefficient of friction $\mu$ of a carriageway which can be utilized to decelerate the vehicle according to the relation $$\mu = \frac{\Theta \cdot \left(\frac{d\omega}{dt}\right)_{max} - M_B}{F_N \cdot r_{dyn}}$$

in which the amount of inertia of the braked wheel which has been relieved of loading is designated by $\Theta$, the wheel load which is acting on the braked wheel which has been relieved of loading is designated by $F_N$, its vehicle-movement rolling radius is designated by $r_{dyn}$, and the braking torque which is given by the generation of brake pressure at the maximum change of rate of the wheel speed is designated by $M_B$ and is given by the relation $$M_B = p_B \cdot C_B$$

in which the applied brake pressure is designated by $p_B$ and a proportionality factor which takes into account the configuration of the brakes is designated by $c_B$.

13. The braking-force control method according to claim 10, wherein, in normal braking mode, pressure is applied to one pair of pistons of four-piston brake calipers of the wheel brakes all of which are utilized and, in diagonal braking mode, brake pressure is applied to one front-wheel brake and one rear-wheel brake, and pressure is applied to each pair of pistons of the wheel brakes.

14. A braking-force control system for a road vehicle, comprising an electrically controllable four-circuit brake system, in which the braking forces which can be generated by individual wheel brakes is adjustable in a wheel-specific way, a chassis which comprises, as a normal-force control system, adjustment devices which are individually assigned to vehicle wheels for varying normal forces acting on the vehicle wheels while maintaining the sum of the axle loads, wherein the adjustment devices are being configured such that the weight of the vehicle can be supported substantially on one of the front wheels and one of the rear wheels of the vehicle, the braking forces which can be generated by a front-wheel brake together with a rear-wheel brake correspond in total to overall vehicle weight multiplied by a maximum absolute value of the coefficient of friction ($\mu$) utilizable between a carriageway and the braked wheels, and an electronic control unit which, when vehicle-movement regulation which stabilizes cornering is necessary, is configured first to activate the normal-force adjustment device in order to compensate oversteered or understeered behavior of the vehicle, and, if appropriate stabilization of the vehicle is not yet achieved thereby, to further activate the braking-force control system in the initiated vehicle-movement regulating mode.

15. A braking-force control method for a road vehicle having an electrically controllable four-circuit brake system comprising the steps of wheel-specifically adjusting braking forces generatable by individual wheel brakes; varying normal forces actuable on vehicle wheels while maintaining a sum of axle loads, in which a weight of the vehicle is substantially supportable approximately on one front wheel and one rear wheel of the vehicle; generating braking forces for a front-wheel brake together with a rear-wheel brake to correspond in total to overall vehicle weight multiplied by a maximum absolute value of the coefficient of friction ($\mu$) which is utilizable between a carriageway and the braked wheels; and when stabilization-cornering regulations is appropriate, first activating a normal-force adjustment for compensating oversteered or understeered vehicle behavior, and, if, necessary further activating braking-force control in an initiated vehicle-movement regulating mode for achieving appropriate vehicle stabilization.

* * * * *